US010444510B1

(12) United States Patent
Lee et al.

(10) Patent No.: US 10,444,510 B1
(45) Date of Patent: Oct. 15, 2019

(54) OPPOSED GRATINGS IN A WAVEGUIDE DISPLAY

(71) Applicant: Facebook Technologies, LLC, Menlo Park, CA (US)

(72) Inventors: Hee Yoon Lee, Redmond, WA (US); Wanli Chi, Sammamish, WA (US); Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/667,235

(22) Filed: Aug. 2, 2017

Related U.S. Application Data

(60) Provisional application No. 62/406,464, filed on Oct. 11, 2016.

(51) Int. Cl.
*G02B 27/01* (2006.01)
*F21V 8/00* (2006.01)
*G02F 1/29* (2006.01)

(52) U.S. Cl.
CPC ......... *G02B 27/0172* (2013.01); *G02B 6/003* (2013.01); *G02B 6/0026* (2013.01); *G02B 6/0035* (2013.01); *G02F 1/29* (2013.01); *G02B 2027/011* (2013.01); *G02B 2027/014* (2013.01); *G02B 2027/0123* (2013.01); *G02B 2027/0178* (2013.01)

(58) Field of Classification Search
CPC .............. G02B 27/0172; G02B 6/0016; G02B 6/0026; G02B 6/003; G02B 6/0035; G02B 2027/0178
USPC ............... 345/7–9; 359/34, 566–576; 385/37
See application file for complete search history.

(56) References Cited

U.S. PATENT DOCUMENTS

2006/0221448 A1* 10/2006 Nivon ................... G02B 5/1814
359/572
2018/0210205 A1* 7/2018 Grey ................... G02B 27/0081

FOREIGN PATENT DOCUMENTS

WO WO-2016020643 A1 * 2/2016 ......... G02B 27/0081

* cited by examiner

*Primary Examiner* — Michael Pervan
(74) *Attorney, Agent, or Firm* — Fenwick & West LLP

(57) ABSTRACT

A waveguide display includes a light source assembly, an output waveguide, and a controller. The light source assembly emits an image light that propagates along an input wave vector. The output waveguide includes a waveguide body with two opposite surfaces. The output waveguide includes a first grating receiving an image light propagating along the input wave vector, a second grating, and a third grating positioned opposite to the second grating and outputting an expanded image light with wave vectors matching the input wave vector. The controller controls the illumination of the light source assembly to form a two-dimensional image.

18 Claims, 11 Drawing Sheets

OPPOSED GRATINGS IN A WAVEGUIDE DISPLAY

CROSS REFERENCE TO RELATED APPLICATIONS

This application claims the benefit of U.S. Provisional Application No. 62/406,464, filed Oct. 11, 2016, which is incorporated by reference in its entirety.

BACKGROUND

The disclosure relates generally to near-eye-display systems, and more specifically to waveguide displays.

Near-eye light field displays project images directly into a user's eye, encompassing both near-eye displays (NEDs) and electronic viewfinders. Conventional near-eye displays (NEDs) generally have a display element that generates image light that passes through one or more lenses before reaching the user's eyes. Additionally, NEDs in virtual reality systems and/or augmented reality systems are typically required to be compact and light weight, and to provide very large exit pupil for ease of use. However, designing a conventional NED to have a very large exit pupil can result in rather large lenses, and a relatively bulky and heavy NED.

SUMMARY

A waveguide display is used for presenting media to a user. In some embodiments, the waveguide display is incorporated into, e.g., a near-eye-display (NED) as part of a virtual reality (VR), augmented reality (AR), mixed reality (MR), or some combination thereof, system. The waveguide display includes a light source, a controller, and an output waveguide. The light source emits image light in accordance with display instructions generated and provided by the controller. The light source emits image light that is at least partially coherent and propagates along an input wave vector. The controller controls the illumination of the light source to form a two-dimensional image. Light from the light source is in-coupled into the output waveguide through an in-coupling area located at one end of the output waveguide. The output waveguide outputs the image light at a location offset from the entrance location, and the location/direction of the emitted image light is based in part on the orientation of the light source.

The output waveguide includes a waveguide body with two opposite surfaces. The output waveguide includes a first grating (e.g., an input grating) on at least one of the opposite surfaces. The first grating in-couples the image light (propagating along an input wave vector) emitted from the light source into the output waveguide, and the first grating has an associated first grating vector. The output waveguide expands the image light in two dimensions. The output waveguide includes a second and third grating (e.g., an output grating) that are associated with a second and third grating vector, respectively that together direct and decouple the expanded image light from the output waveguide, the output expanded image light having a wave vector that matches the input wave vector. The first grating, the second grating, and the third grating are designed such that the vector sum of all their associated grating vectors is less than a threshold value, and the threshold value is close to or equal to zero. In some embodiments, the waveguide display includes multiple waveguides that are stacked together to output an expanded image light projected along multiple planes as a polychromatic display to the user's eyes.

Figure 1:
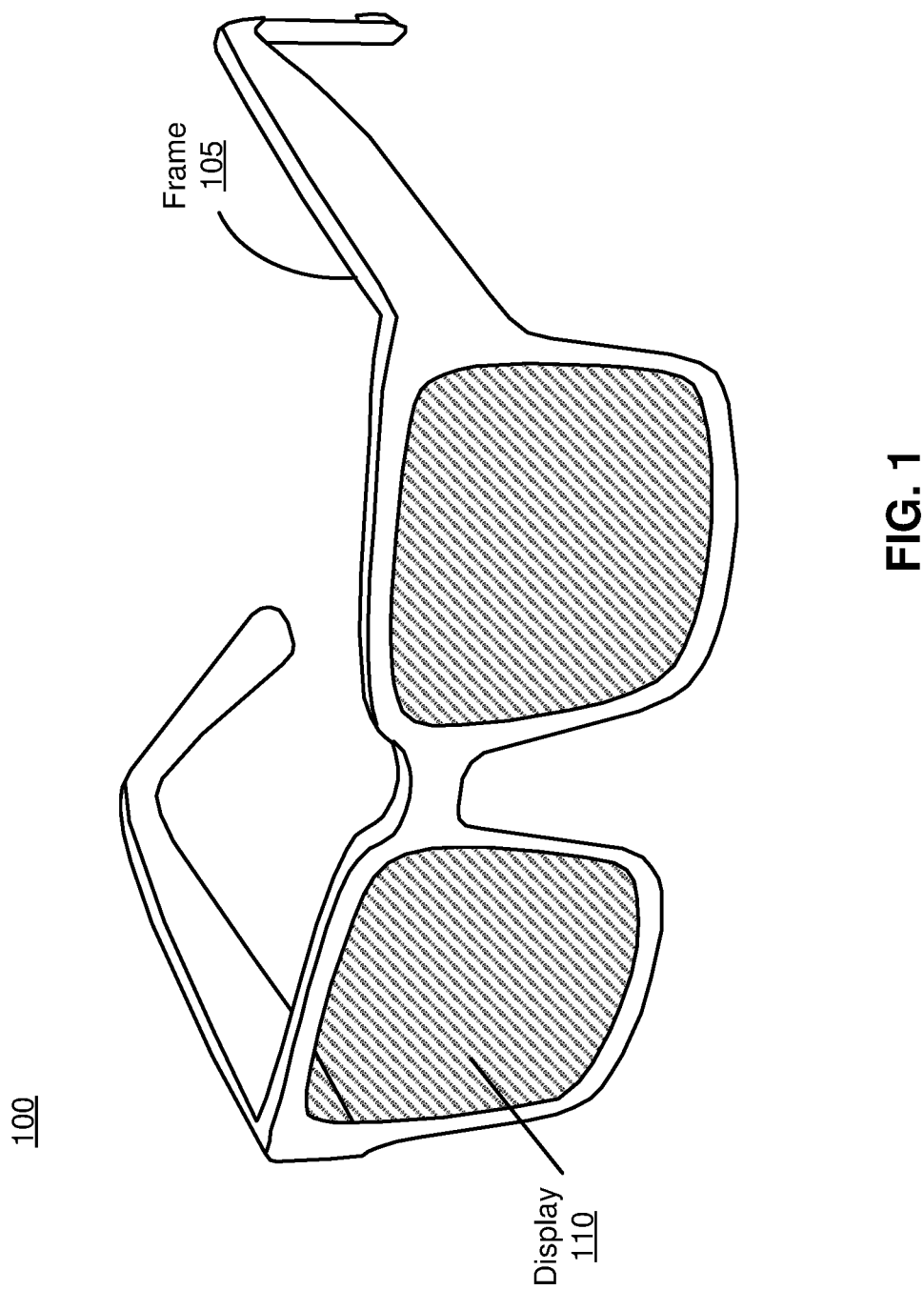
FIG. 1 is a diagram of a NED, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A waveguide display is used for presenting media to a user. In some embodiments, the waveguide display is incorporated into, e.g., a near-eye-display (NED) as part of a virtual reality (VR), augmented reality (AR), mixed reality (MR), or some combination thereof, system. The waveguide display includes a source assembly, a controller, and an output waveguide. The source assembly includes a source and an optics system. The source assembly projects a line image to an infinite viewing distance through a small exit pupil. The line image can be formed by, for example, using a linear array of sources and a collimating lens. The controller controls the illumination of the source to form a two-dimensional image. Light from the source is in-coupled into the output waveguide through an in-coupling area located at one end of the output waveguide. The output waveguide outputs the image light at a location offset from the entrance location, and the location/direction of the emitted image light is based in part on the orientation of the source assembly. The output waveguide includes a waveguide body with two opposite surfaces. The output waveguide includes an input diffraction grating on at least one of the opposite surfaces. The input diffraction grating in-couples the image light (propagating along an input wave vector) emitted from the source assembly into the output waveguide, and the input diffraction grating has an associated first grating vector. A wave vector of a plane wave is a vector which points in the direction in which the wave propagates (perpendicular to the wavefront associated with an image light) and its magnitude is inversely proportional to the wavelength of the light. In some configurations, the wave vector ($k_r$) is defined to be $2\pi/\lambda$, where $\lambda$, is the wavelength of the light. For example, a light for a projector is associated with a radial wave vector ($k_{r0}$) which has a magnitude of zero for a normal incidence on a surface of the output waveguide. In this disclosure, only the radial component of the wave vector (parallel to the waveguide surface) is used. Radial component does not change as the light enters or exits the medium (e.g. waveguide). A grating vector is a vector whose direction is normal to the grating grooves and its vector size is inversely proportional to its pitch. In some configurations, the grating vector ($k_{grating}$) is defined to be $2\pi/p$, where p is the pitch of the grating. Since grating is on the waveguide surface, the grating vector is always parallel to the surface, and thus it affects only the radial component of the wave vector of the image light. Accordingly, the radial component of the wave vector ($k_r$) of an image light bouncing back and forth in the output waveguide is changed to $k_r = k_{r0} + \Sigma k_{grating}$, where $\Sigma k_{grating}$ is a vector sum of the grating vectors associated with the gratings in a waveguide.

The output waveguide expands the image light in two dimensions. The output waveguide includes a second and third grating (that are associated with a second and third grating vector, respectively) that together direct and decouple the expanded image light from the output waveguide, the output expanded image light having a wave vector that matches the input wave vector. The input diffraction grating, the second diffraction grating, and the third diffraction grating are designed such that the vector sum of all their associated grating vectors is less than a threshold value, and the threshold value is close to or equal to zero.

The orientation of the light source is determined by the controller based on the display instructions provided to the light source. Note that the image light used in the waveguide display is polychromatic for each of the primary colors (red, green, and blue) with a finite bandwidth of wavelength. The display acts as a two-dimensional image projector with an extended pupil over two orthogonal dimensions. In some embodiments, the waveguide display includes multiple output waveguides that are stacked together to output an expanded image light that is full-colored. In alternate embodiments, the waveguide display includes multiple waveguides that are stacked together to output an expanded image light projected along multiple planes as monochromatic or polychromatic display to the user's eyes.

FIG. 1 is a diagram of a near-eye-display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as a VR NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 is coupled to one or more optical elements which together display media to users. In some embodiments, the frame 105 may represent a frame of eye-wear glasses. The display 110 is configured for users to see the content presented by the NED 100. As discussed below in conjunction with FIG. 2, the display 110 includes at least one waveguide display assembly (not shown) for directing one or more image light to an eye of the user. The waveguide display assembly includes, e.g., a waveguide display, a stacked waveguide display, a varifocal waveguide display, or some combination thereof. The stacked waveguide display is a polychromatic display created by stacking waveguide displays whose respective monochromatic sources are of different colors. The stacked waveguide display is also a polychromatic display that can be projected on multiple planes (e.g. multi-planar display). The varifocal waveguide display is a display that can adjust a focal position of image light emitted from the waveguide display.

Figure 2:
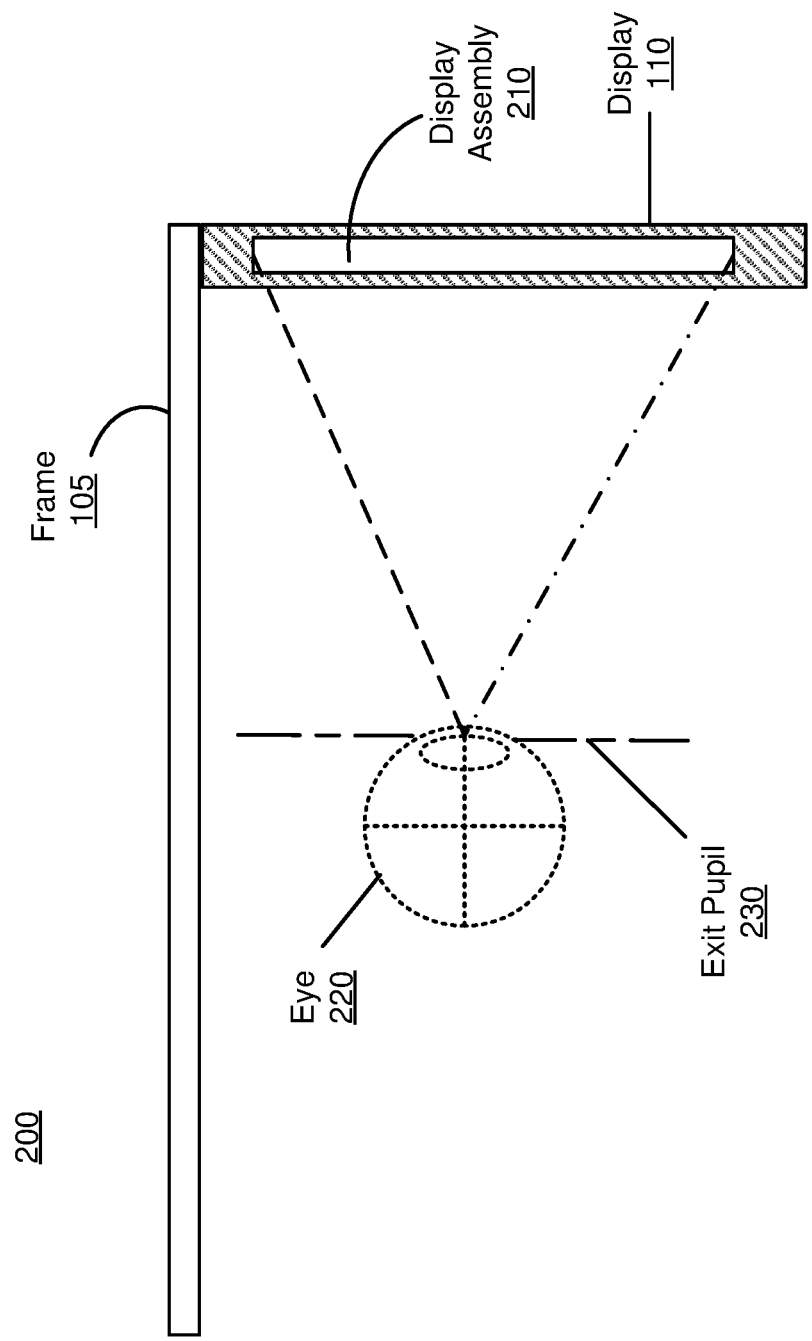
FIG. 2 is a cross-section of the NED illustrated in FIG. 1, in accordance with an embodiment.

FIG. 2 is a cross-section 200 of the NED 100 illustrated in FIG. 1, in accordance with an embodiment. The display 110 includes at least one display assembly 210. An exit pupil 230 is a location where the eye 220 is positioned when the user wears the NED 100. For purposes of illustration, FIG. 2 shows the cross section 200 associated with a single eye 220 and a single display assembly 210, but in alternative embodiments not shown, another waveguide display assembly which is separate from the waveguide display assembly 210 shown in FIG. 2, provides image light to another eye 220 of the user.

The display assembly 210, as illustrated below in FIG. 2, is configured to direct the image light to the eye 220 through the exit pupil 230. The display assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the display assembly 210 and the eye 220. The optical elements may act to, e.g., correct aberrations in image light emitted from the display assembly 210, magnify image light emitted from the display assembly 210, some other optical adjustment of image light emitted from the display assembly 210, or some combination thereof. The example for optical elements may include an aperture, a Fresnel lens, a convex lens, a concave lens, a filter, or any other suitable optical element that affects image light.

In some embodiments, the display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g. multi-planar colored display). In some configurations, the stacked waveguide display is a monochromatic display that can be projected on multiple planes (e.g. multi-planar monochromatic display). The varifocal waveguide display is a display that can adjust a focal position of image light emitted from the waveguide display. In alternate embodiments, the display assembly 210 may include the stacked waveguide display and the varifocal waveguide display.

Figure 3:
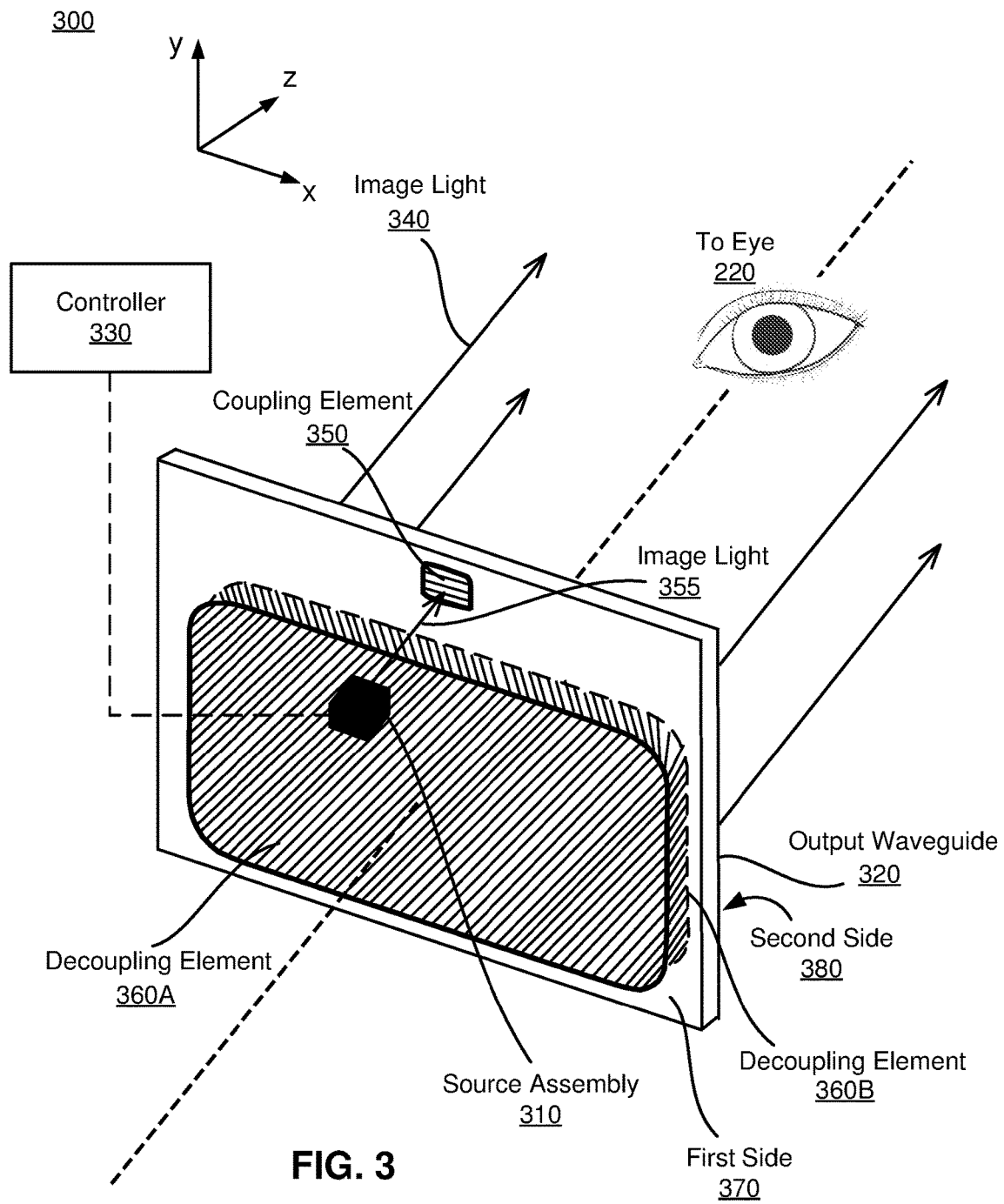
FIG. 3 illustrates an isometric view of a waveguide display, in accordance with an embodiment.

FIG. 3 illustrates an isometric view of a waveguide display 300, in accordance with an embodiment. In some embodiments, the waveguide display 300 is a component (e.g., display assembly 210) of the NED 100. In alternate embodiments, the waveguide display 300 is part of some other NED, or other system that directs display image light to a particular location.

The waveguide display 300 includes at least a source assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye.

The source assembly 310 generates image light. The source assembly 310 includes an optical source, and an optics system (e.g., as further described below with regard to FIG. 4). The source assembly 310 generates and outputs image light 355 to a coupling element 350 located on a first side 370 of the output waveguide 320. The image light 355 propagates along a dimension with an input wave vector as described below with reference to FIG. 6.

The output waveguide 320 is an optical waveguide that outputs image light to an eye 220 of a user. The output waveguide 320 receives the image light 355 at one or more coupling elements 350 located on the first side 370, and guides the received input image light to decoupling element 360A. In some embodiments, the coupling element 350 couples the image light 355 from the source assembly 310 into the output waveguide 320. The coupling element 350 may be, e.g., a diffraction grating, a holographic grating, one or more cascaded reflectors, one or more prismatic surface elements, an array of holographic reflectors, or some combination thereof. In some configurations, each of the coupling elements 350 have substantially the same area along the X-axis and the Y-axis dimension, and are separated by a distance along the Z-axis (e.g. on the first side 370 and the second side 380, or both on the first side 370 but separated with an interfacial layer (not shown), or on the second side 380 and separated with an interfacial layer or both embedded into the waveguide body of the output waveguide 320 but separated with the interface layer). The coupling element 350 has a first grating vector. The pitch of the coupling element 350 may be 300-600 nm.

The decoupling element 360A redirects the total internally reflected image light from the output waveguide 320 such that it may be decoupled via the decoupling element 360B. The decoupling element 360A is part of, or affixed to, the first side 370 of the output waveguide 320. The decoupling element 360B is part of, or affixed to, the second side 380 of the output waveguide 320, such that the decoupling element 360A is opposed to the decoupling element 360B. Opposed elements are opposite to each other on a waveguide. In some configurations, there may be an offset between the opposed elements. For example, the offset can be one quarter of the length of an opposed element. The decoupling elements 360A and 360B may be, e.g., a diffraction grating, or a holographic grating, one or more cascaded reflectors, one or more prismatic surface elements, an array of holographic reflectors, or some combination thereof. In some configurations, each of the decoupling elements 360A have substantially the same area along the X-axis and the Y-axis dimension, and are separated by a distance along the Z-axis (e.g. on the first side 370 and the second side 380, or both on the first side 370 but separated with an interfacial layer (not shown), or on the second side 380 and separated with an interfacial layer or both embedded into the waveguide body of the output waveguide 320 but separated with the interface layer). The decoupling element 360A has an associated second grating vector, and the decoupling element 360B has an associated third grating vector. An orientation and position of the image light exiting from the output waveguide 320 is controlled by changing an orientation and position of the image light 355 entering the coupling element 350. The pitch of the decoupling element 360A and/or the decoupling element 360B may be 300-600 nm. In some configurations, the decoupling element 360A receives an image light from the coupling element 350 covering a first portion of the first angular range emitted by the source assembly 310, the decoupling element 360B diffracts the image light to a first order of diffraction in order to trap the image light in the output waveguide 320. In alternate configurations, the decoupling element 360B receives the image light from the coupling element 350 covering a second portion of the first angular range emitted by the source assembly 310, and the decoupling element 360A diffracts the image light to a first diffracted order in order to trap the image light in the output waveguide 320.

The coupling element 350, the decoupling element 360A, and the decoupling element 360B are designed such that a sum of their respective grating vectors is less than a threshold value, and the threshold value is close to or equal to zero. Accordingly, the image light 355 entering the output waveguide 320 is propagating in the same direction when it is output as image light 340 from the output waveguide 320. Moreover, in alternate embodiments, additional coupling elements and/or de-coupling elements may be added. And so long as the sum of their respective grating vectors is less than the threshold value, the image light 355 and the image light 340 propagate in the same direction. The location of the coupling element 350 relative to the decoupling element 360A and the decoupling element 360B as shown in FIG. 3 is only an example. In other configurations, the location could be on any other portion of the output waveguide 320 (e.g. a top edge of the first side 370, a bottom edge of the first side 370). In some embodiments, the waveguide display 300 includes a plurality of source assemblies 310 and/or a plurality of coupling elements 350 to increase the FOV further.

The output waveguide 320 includes a waveguide body with the first side 370 and a second side 380 that are opposite to each other. In the example of FIG. 3, the waveguide body includes the two opposite sides—the first side 370 and the second side 380, each of the opposite sides representing a plane along the X-dimension and Y-dimension. The output waveguide 320 may be composed of one or more materials that facilitate total internal reflection of the image light 355. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.5-1 mm thick along Z-dimension.

The controller 330 controls the illumination operations of the source assembly 310. The controller 330 determines display instructions for the source assembly 310. Display instructions are instructions to render one or more images. In some embodiments, display instructions may simply be an image file (e.g., bitmap). The display instructions may be received from, e.g., a console of a system (e.g., as described below in conjunction with FIG. 7). Display instructions are instructions used by the source assembly 310 to generate image light 340. The display instructions may include, e.g., a type of a source of image light (e.g. monochromatic, polychromatic), one or more illumination parameters (described below with reference to FIG. 4), or some combination thereof. The controller 330 includes a combination of hardware, software, and/or firmware not shown here so as not to obscure other aspects of the disclosure.

In alternate configurations (not shown), the output waveguide 320 includes the coupling element 350 on the first side 370 and a second coupling element (not shown here) on the second side 380. The coupling element 350 receives an image light 355 from the source assembly 310. The coupling element on the second side 380 receives an image light from the source assembly 310 and/or a different source assembly. The controller 330 determines the display instructions for the source assembly 310 based at least on the one or more display instructions.

In alternate configurations, the output waveguide 320 may be oriented such that the source assembly 310 generates the image light 355 propagating along an input wave vector in the Z-dimension. The output waveguide 320 outputs the image light 340 propagating along an output wave vector that matches the input wave vector. In some configurations, the image light 340 is a monochromatic image light that can be projected on multiple planes (e.g. multi-planar monochromatic display). In alternate configurations, the image light 340 is a polychromatic image light that can be projected on multiple planes (e.g. multi-planar polychromatic display).

In some embodiments, the output waveguide 320 outputs the expanded image light 340 to the user's eye 220 with a very large FOV. For example, the expanded image light 340 couples to the user's eye 220 with a diagonal FOV (in x and y) of at least 60 degrees. Generally, the horizontal FOV is larger than the vertical FOV. If the aspect ratio is 16:9, the product of the horizontal FOV and the vertical FOV will be ~52×30 degrees whose diagonal FOV is 60 degrees for instance.

Figure 4:
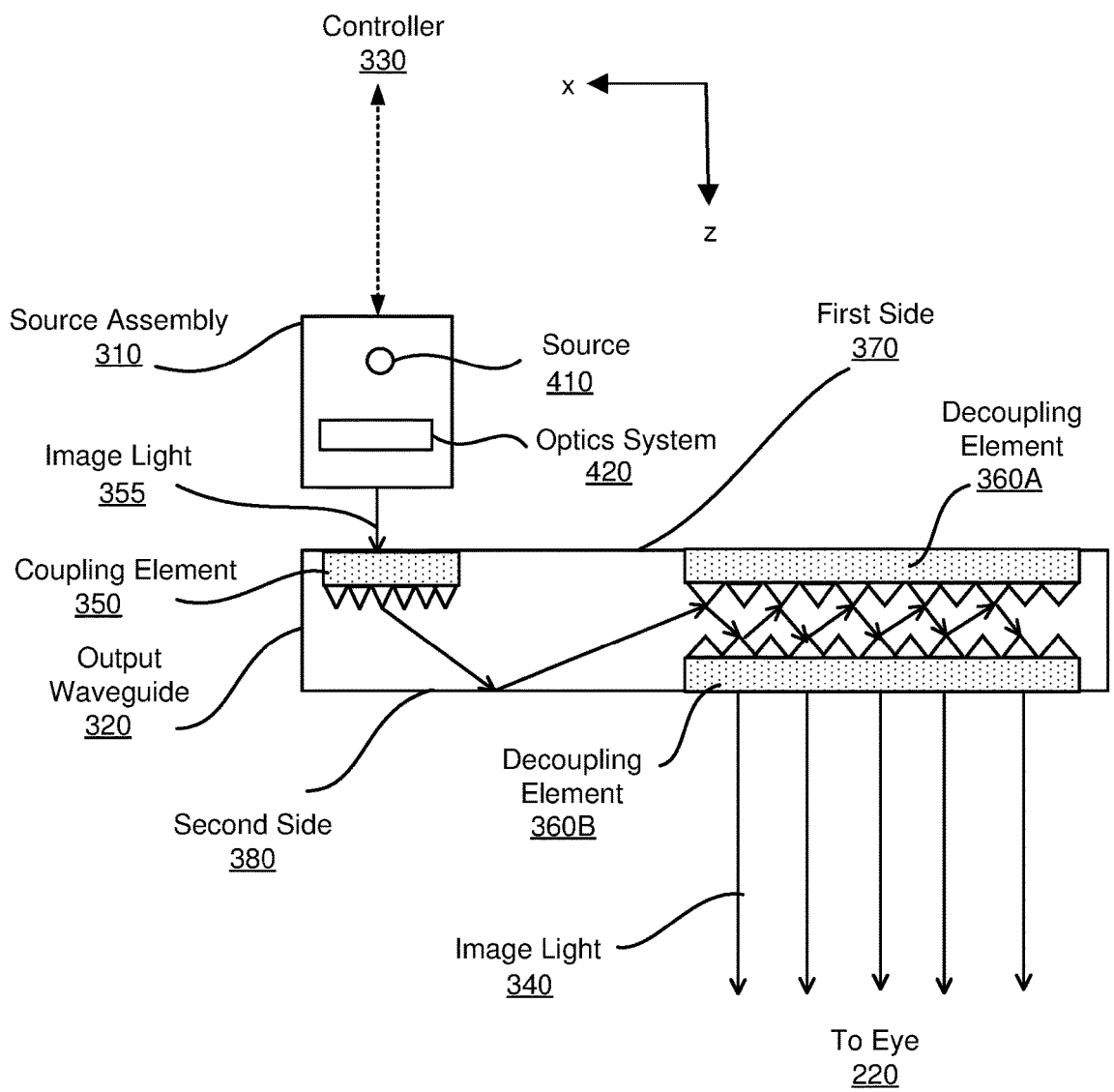
FIG. 4 illustrates a cross-section of the waveguide display shown in FIG. 3, in accordance with an embodiment.

FIG. 4 illustrates a cross-section of the waveguide display 300 shown in FIG. 3, in accordance with an embodiment. The cross-section 400 of the waveguide display 300 includes at least the source assembly 310 and the output waveguide 320.

The source assembly 310 generates light in accordance with display instructions from the controller 330. The source assembly 310 includes a source 410, and an optics system 420. The source 410 is a source of light that generates at least a coherent or partially coherent image light. The source 410 may be, e.g., laser diode, a vertical cavity surface emitting laser, a light emitting diode, a tunable laser, a MicroLED, a superluminous LED (SLED), or some other light source that emits coherent or partially coherent light. The source 410 emits light in a visible band (e.g., from about 390 nm to 700 nm), and it may emit light that is continuous or pulsed. In some embodiments, the source 410 may be a laser that emits light at a particular wavelength (e.g., 532 nanometers). The source 410 emits light in accordance with one or more illumination parameters received from the controller 330. An illumination parameter is an instruction used by the source 410 to generate light. An illumination parameter may include, e.g., restriction of input wave vector for total internal reflection, restriction of input wave vector for maximum angle, source wavelength, pulse rate, pulse amplitude, beam type (continuous or pulsed), other parameter(s) that affect the emitted light, or some combination thereof.

The optics system 420 includes one or more optical components that condition the light from the source 410. Conditioning light from the source 410 may include, e.g., expanding, collimating, adjusting orientation in accordance with instructions from the controller 330, some other adjustment of the light, or some combination thereof. The one or more optical components may include, e.g., lenses, mirrors, apertures, gratings, or some combination thereof. In some configurations, the optics system 420 includes liquid lens with a plurality of electrodes that allows scanning a beam of light with a threshold value of scanning angle in order to shift the beam of light to a region outside the liquid lens. In an alternate configuration, the optics system 420 includes a voice coil motor that performs a one dimensional scanning of the light to a threshold value of scanning angle. The voice coil motor performs a movement of one or more lens to change a direction of the light outside the one or more lens in order to fill in the gaps between each of the multiple lines scanned. Light emitted from the optics system 420 (and also the source assembly 310) is referred to as image light 355. The optics system 420 outputs the image light 355 at a particular orientation (in accordance with the display instructions) toward the output waveguide 320. The image light 355 propagates along an input wave vector such that the restrictions for both total internal reflection and maximum angle of propagation are met.

The output waveguide 320 receives the image light 355. The coupling element 350 at the first side 370 couples the image light 355 from the source assembly 310 into the output waveguide 320. In embodiments where the coupling element 350 is diffraction grating, the pitch of the diffraction grating is chosen such that total internal reflection occurs, and the image light 355 propagates internally toward the decoupling element 360A. For example, the pitch of the coupling element 350 may be in the range of 300 nm to 600 nm. In alternate embodiments, the coupling element 350 is located at the second side 380 of the output waveguide 320.

The decoupling element 360A redirects the image light 355 toward the decoupling element 360B for decoupling from the output waveguide 320. In embodiments where the decoupling element 360A is a diffraction grating, the pitch of the diffraction grating is chosen to cause incident image light 355 to exit the output waveguide 320 at a specific angle of inclination to the surface of the output waveguide 320. An orientation of the image light exiting from the output waveguide 320 may be altered by varying the orientation of the image light exiting the source assembly 310, varying an orientation of the source assembly 310, or some combination thereof. For example, the pitch of the diffraction grating may be in the range of 300 nm to 600 nm. Both the coupling element 350 and the decoupling element 360A are designed such that a sum of their respective grating vectors is less than a threshold value, and the threshold value is close to or equal to zero.

In some configurations, the first decoupling element 360A receives the image light 355 from the coupling element 350 after total internal reflection in the waveguide body and transmits an expanded image light to the second decoupling element 360B at the second side 380. The second decoupling element 360B decouples the expanded image light 340 from the second side 380 of the output waveguide 320 to the user's eye 220. The first decoupling element 360A and the second decoupling element 360B are structurally similar. In alternate configurations, the second decoupling element 360B receives the image light 355 after total internal reflection in the waveguide body and transmits an expanded image light from the first decoupling element 360A on the first side 370.

The image light 340 exiting the output waveguide 320 is expanded at least along one dimension (e.g., may be elongated along X-dimension). The image light 340 couples to the human eye 220. The image light 340 exits the output waveguide 320 such that a sum of the respective grating vectors of each of the coupling element 350, the decoupling element 360A, and the decoupling element 360B is less than a threshold value, and the threshold value is close to or equal to zero. An exact threshold value is going to be system specific, however, it should be small enough to not degrade image resolution beyond acceptable standards (if non-zero dispersion occurs and resolution starts to drop). In some configurations, the image light 340 propagates along wave vectors along at least one of X-dimension, Y-dimension, and Z-dimension.

In alternate embodiments, the image light 340 exits the output waveguide 320 via the decoupling element 360A. Note the decoupling elements 360A and 360B are larger than the coupling element 350, as the image light 340 is provided to an eyebox located at an exit pupil of the waveguide display 300.

In another embodiment, the waveguide display 300 includes two or more decoupling elements. For example, the decoupling element 360A may include multiple decoupling elements located side by side with an offset. In another example, the decoupling element 360A may include multiple decoupling elements stacked together to create a two-dimensional decoupling element.

The controller 330 controls the source assembly 310 by providing display instructions to the source assembly 310. The display instructions cause the source assembly 310 to render light such that image light exiting the decoupling element 360A of the output waveguide 320 scans out one or more 2D images. For example, the display instructions may cause the source assembly 310 (via adjustments to optical elements in the optics system 420) to scan out an image in accordance with a scan pattern (e.g., raster, interlaced, etc.). The display instructions control an intensity of light emitted from the source 410, and the optics system 420 scans out the image by rapidly adjusting orientation of the emitted light. If done fast enough, a human eye integrates the scanned pattern into a single 2D image.

Stacked Waveguide Display

A collimated beam of image light has one or more physical properties, including, but not restricted to, wavelength, luminous intensity, flux, etc. The wavelength of collimated beam of image light from a source assembly (e.g., 410) strongly impacts, among several other parameters, the FOV, as described above in conjunction with FIG. 2, of the NED 100. The FOV would be very small in cases where a source assembly emits image light across an entire visible band of image light. However, the waveguide display 300 has a relatively large FOV as the waveguide display 300 includes a mono-chromatic source in the example shown in FIG. 4. Accordingly, to generate a polychromatic display that has a large FOV, one or more monochromatic waveguide displays (with one or more image light at different wavelengths) are stacked to generate a single polychromatic stacked waveguide display.

The waveguide display 400 of FIG. 4 shows an example with a single output waveguide 320 receiving a monochromatic beam of image light 355 from the source assembly 310. In alternate embodiments, the waveguide display 400 includes a plurality of source assemblies 310 and a plurality of output waveguides 320. Each of the source assemblies 310 emits a monochromatic image light of a specific band of wavelength corresponding to one of the primary colors (red, green, and blue). Each of the output waveguides 320 may be stacked together with a distance of separation to output an expanded image light 340 that is multi-colored. The output waveguides are stacked such that image light (e.g., 340) from each of the stacked waveguides occupies a same area of the exit pupil of the stacked waveguide display. For example, the output waveguides may be stacked such that decoupling elements from adjacent optical waveguides are lined up and light from a rear output waveguide would pass through the decoupling element of the waveguide adjacent to and in front of the read output waveguide. In some configurations, the expanded image light 340 can couple to the user's eye 220 as a multi-planar display. For example, the expanded image light 340 may include a display along at least two of the X-Y plane, Y-Z plane, and the X-Z plane.

In alternate embodiments, the location of the coupling element 350 can be located on the second side 380. In some configurations, the waveguide display 400 may perform an illumination operation of the source 410 inside the source assembly 310 to form a line image. The location of the coupling element 350 shown in FIG. 4 is only an example, and several other arrangements are apparent to one of ordinary skill in the art.

Figure 5:
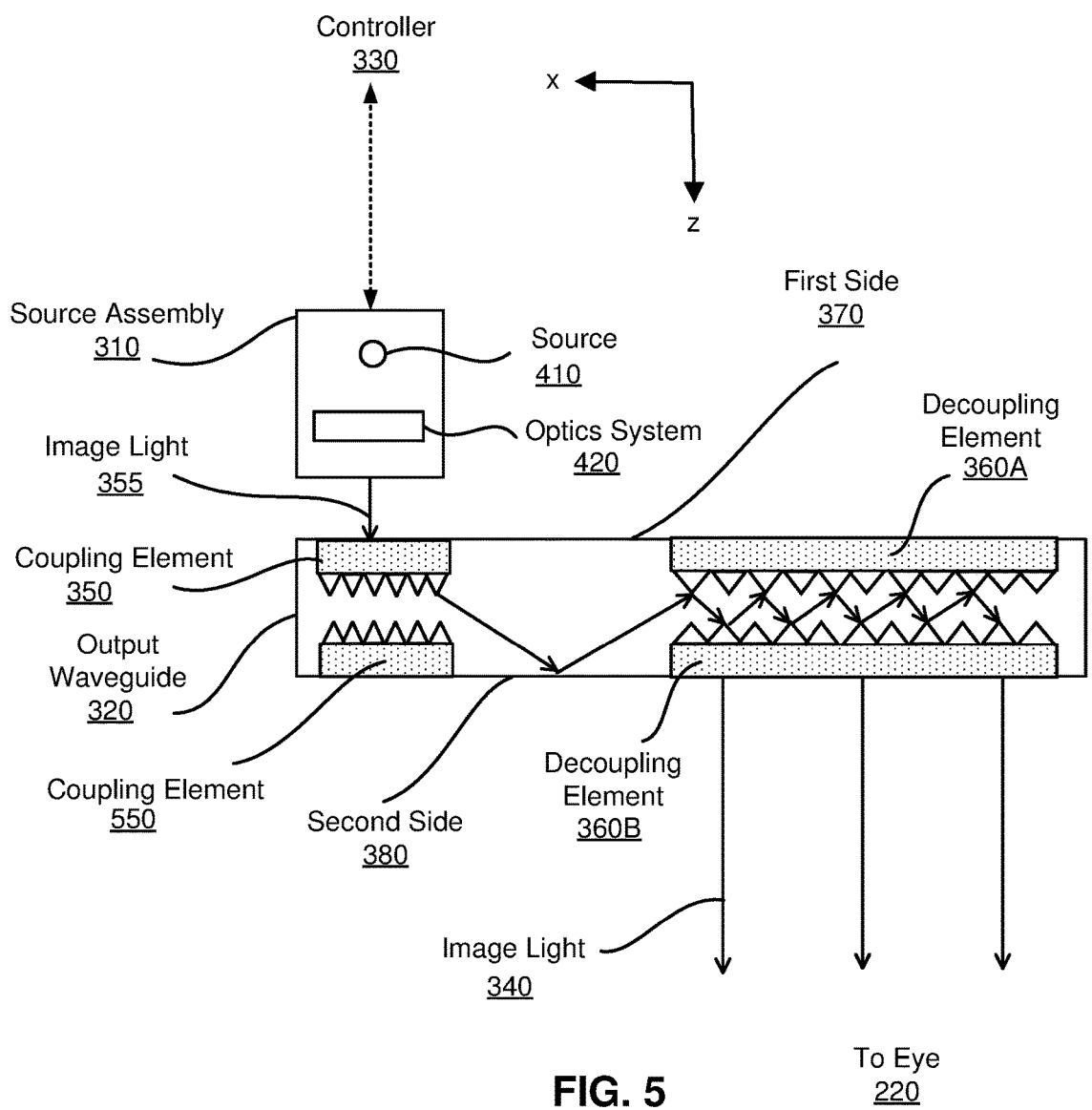
FIG. 5 illustrates a cross-section of a waveguide display that includes an output waveguide including four gratings, in accordance with an embodiment.

FIG. 5 illustrates a cross-section of a waveguide display 500 that includes the output waveguide 320 including four gratings, in accordance with an embodiment. The waveguide display 500 is an embodiment of the waveguide display 300. The waveguide display 500 is substantially similar to the waveguide display 300 except that it also includes a coupling element 550, and that the grating vectors for one or more of the coupling elements and decoupling elements may be different from those described above with respect to FIGS. 3 and 4.

The output waveguide 320 includes the first coupling element 350, a second coupling element 550, the decoupling element 360A, and the decoupling element 360B. The coupling element 550 is an embodiment of the coupling element 350 of FIG. 4. The coupling element 550 may be, e.g., a diffraction grating, a holographic grating, some other element that couples the image light 355 into the output waveguide 320, or some combination thereof. The coupling element 550 increases the coupling efficiency of the waveguide display across a large FOV. In some embodiments, the FOV is divided into a first and second portion, and the coupling element 350 diffracts a first portion of the FOV and the coupling element 550 diffracts the second portion the FOV. Accordingly, the entire FOV can be covered by the coupling element 350, the coupling element 550, or both.

In the example of FIG. 5, the output waveguide 320 includes the first coupling element 350 at the first side 370 that is away from the user's eye 220. The output waveguide 320 includes the second coupling element 550 at the second side 380 that is closer to the user's eye 220. The output waveguide 320 receives the image light 355 emitted from the source assembly 310 at the coupling element 350. The image light 355 propagates along a wave vector in the Z-dimension. The coupling element 350 couples the image light 355 from the source assembly 310 into the output waveguide 320. The decoupling element 360A redirects the image light in accordance with its grating vector. The decoupling element 360B decouples the image light 340 from the output waveguide 320 such that a sum of the respective grating vectors of each of the coupling element 350, the decoupling element 360A, and the decoupling element 360B is less than a threshold value, and the threshold value is close to or equal to zero. In some examples, the possible orders of summation of grating vectors may include: (1) an input grating vector associated with the coupling element 350, a grating vector associated with the decoupling element 360A, and a grating vector associated with the decoupling element 360B, (2) the input grating vector associated with the coupling element 350, the grating vector associated with the decoupling element 360B, and the grating vector associated with the decoupling element 360A, (3) a second input grating vector associated with the coupling element 550, the grating vector associated with the decoupling element 360A, and the grating vector associated with the decoupling element 360B, and (4) the second input grating vector associated with the coupling element 550, the grating vector associated with the decoupling element 360B, and the grating vector associated with the decoupling element 360A. In an alternate embodiment (not shown), the output waveguide 320 receives the image light 355 emitted from the source assembly 310 at the coupling element 550 which is located at the second side 380.

In a different configuration, the cross-section of the waveguide display 500 includes the source assembly 310 and/or different source assemblies. The controller 330 provides display instructions to each of the source assemblies 310 to render image light exiting the decoupling element 360B of the output waveguide 320 that scans out one or more 2D images such that a sum of the respective grating vectors of each of the coupling element 350, the decoupling element 360A, and the decoupling element 360B is less than a threshold value, and the threshold value is close to or equal to zero.

The design of the diffraction grating used in the coupling element 350, and the coupling element 550 are such that the conditions for both the restriction on the occurrence of total internal reflection and a maximum angle ($\theta_{max}$) restriction are satisfied. In some configurations, the restriction on the radial wave vector is governed by the physical relationship shown by the inequality below:

$$2\pi/\lambda_0 \le |k_r| \le 2\pi n \sin(\theta_{max})/\lambda_0 \qquad (1)$$

where $|k_r|$ is the magnitude of the radial wave vector n is the refractive index of the output waveguide 320, and $\lambda_0$ is the center wavelength of the image light 355. The lower limit of the inequality (1) above restricts the condition on total internal reflection of the image light 355 and the upper limit restricts the condition on the maximum angle. The threshold value on the maximum angle is based on a desired level of the light bouncing back and forth in the waveguide. In some examples, the maximum angle ($\theta_{max}$) can be at most 75 degrees and the refractive index (n) can be in the range of 1.5-1.9

Figure 6A:
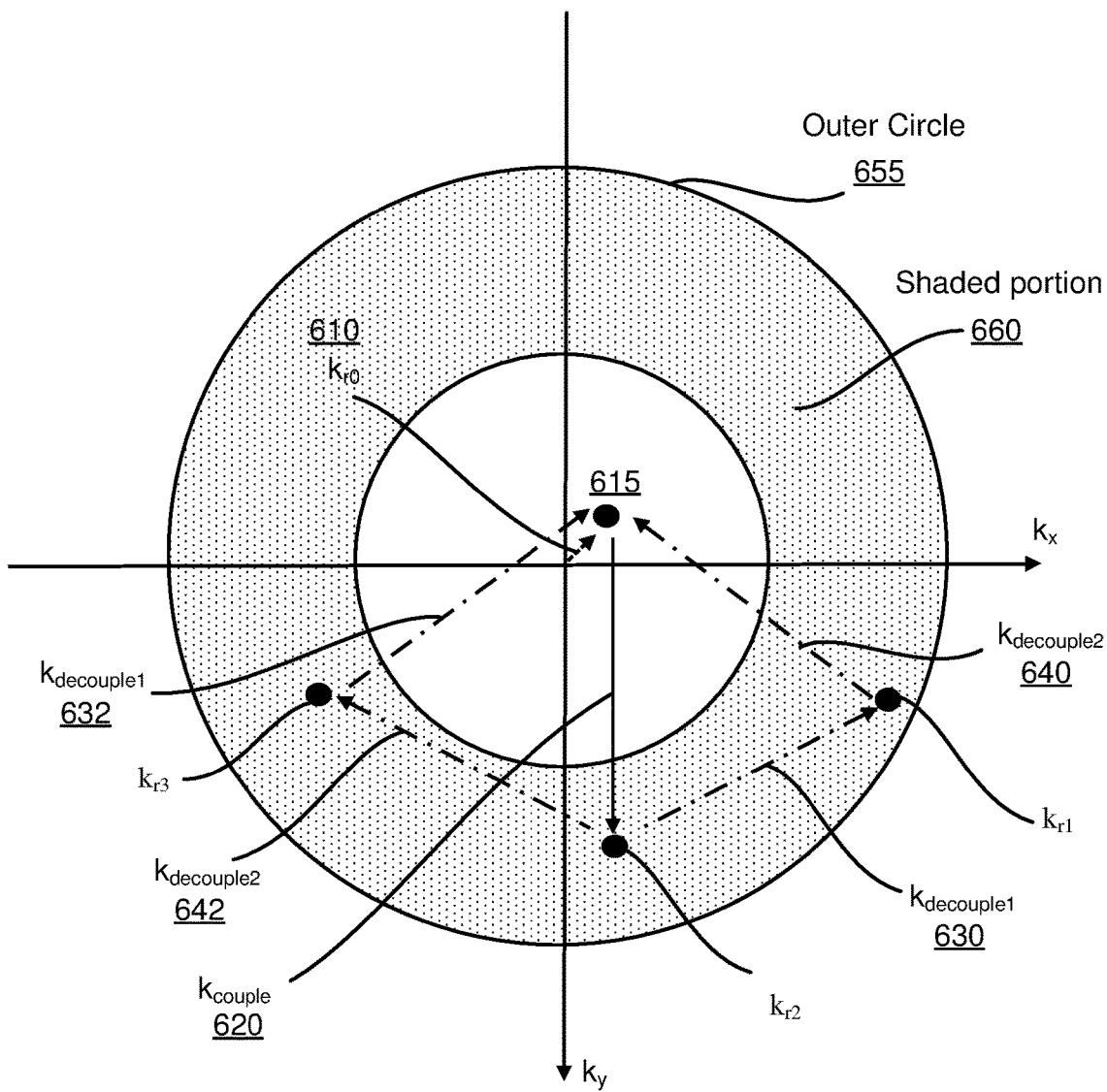
FIG. 6A illustrates an example path of a wave vector in an equilateral configuration, according to an embodiment.

FIG. 6A illustrates an example path 600 of wave vector in an equilateral configuration, according to an embodiment. The example path 600 is a path of a wave vector of the image light that is affected by the grating vectors of the coupling element and the decoupling elements that the image light meets. In the example path 600, image light from the source assembly is associated with a projected radial wave vector, $k_{r0}$ 610. The image light is coupled into the output waveguide via a coupling element associated with an input grating vector, $k_{couple}$ 620. The in-coupled light is then diffracted by a first decoupling element associated with a grating vector, $k_{decouple1}$ 630. The light is then diffracted (and out coupled from the output waveguide) by a second decoupling element associated with a grating vector, $k_{decouple2}$ 640. Note that the summation of the $k_{couple}$ 620, the $k_{decouple1}$ 630, and the $k_{decouple2}$ 640 is zero (i.e., grating vectors return to point 615). Additionally, there are other embodiments of grating vectors that result in a zero summation. For example, the $k_{couple}$ 620, a $k_{decouple2}$ 642, and a $k_{decouple1}$ 632.

The magnitude of the radial wave vector ($k_r$) of the light should be less than a radius of an outer circle 655 in order to remain coupled in the output waveguide and also more than the condition for the occurrence of total internal reflection. The radius of the outer circle 655 is a function of the refractive index of the output waveguide, the maximum angle ($\theta_{max}$), and the center wavelength of the image light as shown in the inequality (1) above. Accordingly, to meet these conditions, the radial wave vector ($k_r$) of the light should be in a shaded portion 660. For example, $k_{r1}$ (=$k_{r0}$+ $k_{couple}$) is within the shaded portion 660, so the incoupling was successful in the figure.

The coupling element, the first decoupling element, and the second decoupling element, are diffraction gratings whose grating vectors sum to a value that is less than a threshold value, and the threshold value is close to or equal to zero. In this example, a zero summation occurs, as the vector path returns to its origination point 615. With the occurrence of the zero summation, the image light exits the output waveguide with the same angle as the incident angle from the source assembly since the remaining radial wave vector is the $k_{r0}$ 610 associated with the FOV of the waveguide display.

Note this is a very simple example, and there are many alternative embodiments, as described below in conjunction with FIG. 6B-D, including various diffraction gratings whose summation of grating vectors returns to the origination point 615. For example, the path 600 is shaped like an equilateral triangle with an equal magnitude of the $k_{couple}$ 620, the $k_{decouple1}$ 630 and the $k_{decouple2}$ 640, other paths may be a hexagon, a pentagon, a parallelogram, a rectangle, or any other shape whose sum of grid vectors is less than the threshold value.

Figure 6B:
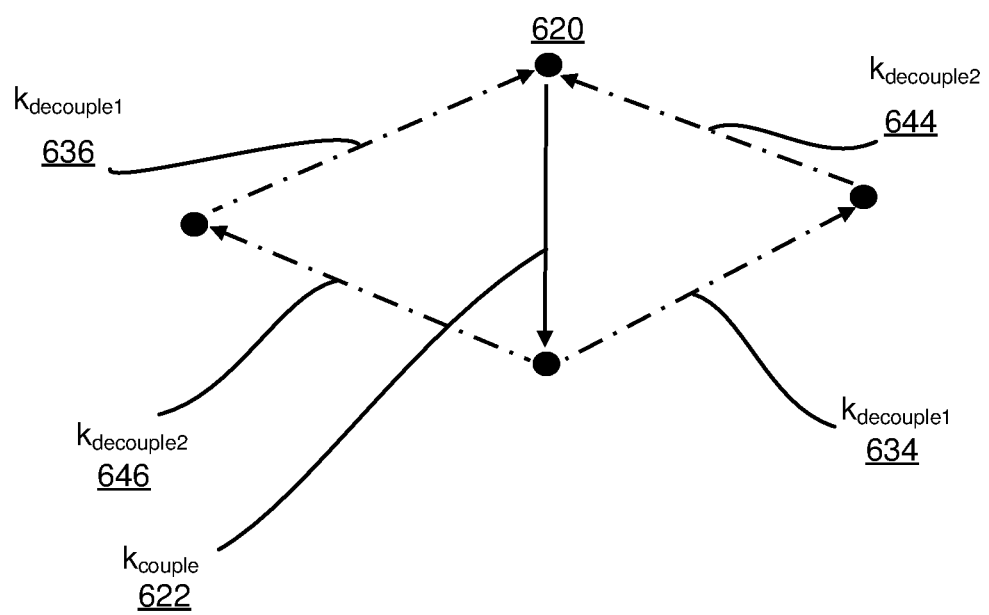
FIG. 6B illustrates an example path of a wave vector in a non-equilateral configuration, according to an embodiment.

FIG. 6B illustrates an example path 602 of a wave vector in a non-equilateral configuration, according to an embodiment. The example path 602 is associated with a coupling element and decoupling elements. The example path 602 of FIG. 6B is an embodiment of the example 600 of FIG. 6A except that the magnitudes of at least two of $k_{couple}$ 622, $k_{decouple1}$ 634, and $k_{decouple2}$ 644 or $k_{couple}$ 622, $k_{decouple1}$ 636, and $k_{decouple2}$ 646 are not equal. Again note that the vector sum of the grating vectors is zero.

Figure 6C:
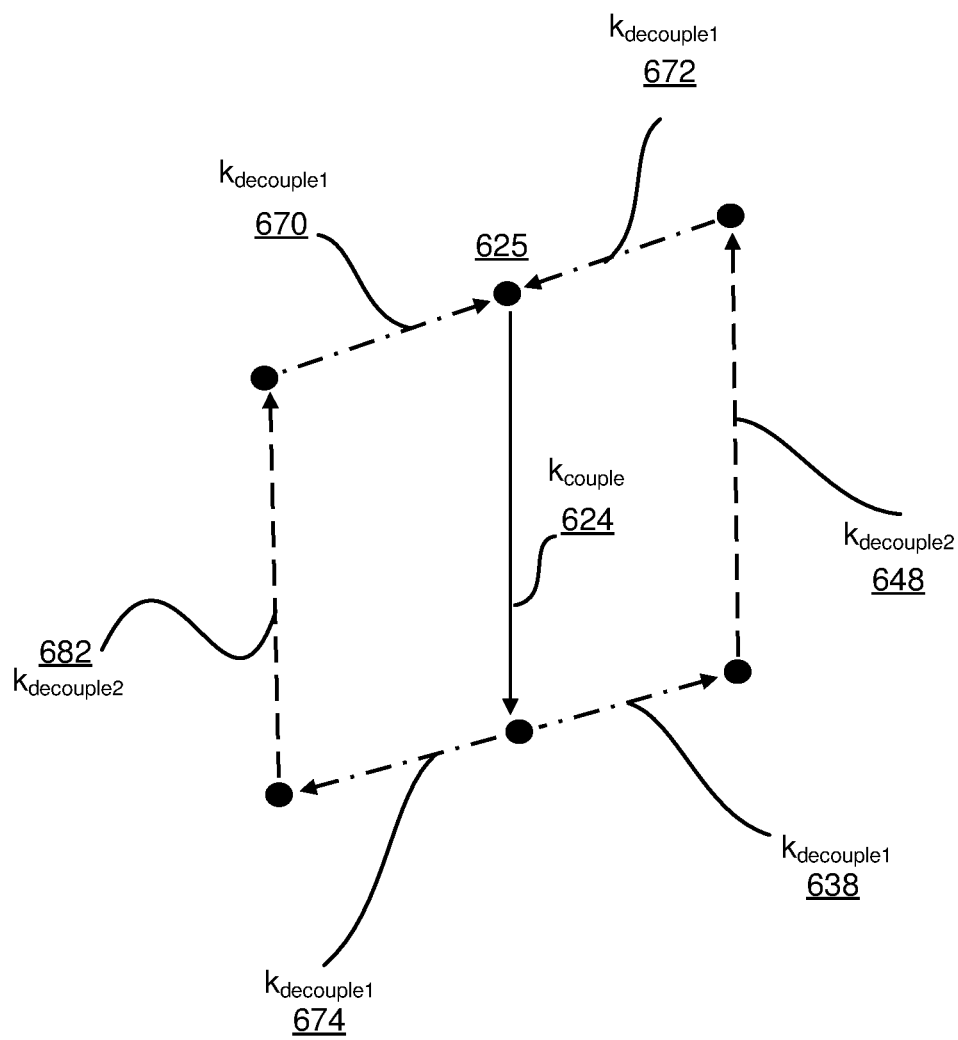
FIG. 6C illustrates an example path of a wave vector in a parallelogram configuration, in accordance with an embodiment.

FIG. 6C illustrates an example path 604 of a wave vector in a parallelogram configuration, in accordance with an embodiment. The example path 604 is associated with a coupling element, and two different decoupling elements. The design of the $k_{decouple1}$ 672 is such that its direction and magnitude results in a zero summation at a summation point 625. In the example path 604, the possible order of summation also includes the $k_{couple}$ 624, the $k_{decouple1}$ 674, the $k_{decouple2}$ 682, and a $k_{decouple1}$ 670, or the $k_{couple}$ 624, the $k_{decouple1}$ 638, the $k_{decouple2}$ 648, and a $k_{decouple1}$ 672. The example path 604 illustrates the scenario when the image light is reflected by the decoupling elements three times. Note that the vector sum of the grating vectors is zero.

Figure 6D:
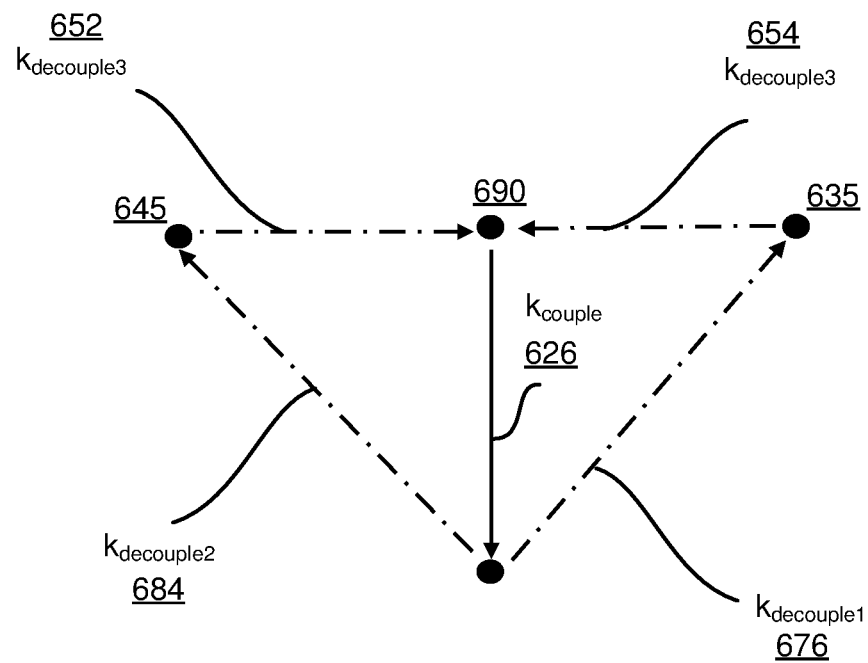
FIG. 6D illustrates an example path of a wave vector in a triangular configuration, in accordance with an embodiment.

FIG. 6D illustrates an example path 606 of a wave vector in a triangular configuration, in accordance with an embodiment. The example path 606 is associated with a coupling element and three decoupling elements. For the path 606, two of the three decoupling elements are on the same side of the output waveguide. In the example path 606, the possible order of summation can be $k_{couple}$ 626, a $k_{decouple2}$ 684, and a $k_{decouple3}$ 652, or $k_{couple}$ 626, a $k_{decouple2}$ 676, and a $k_{decouple3}$ 653. Note that the two decoupling elements on the same side are associated with $k_{decouple1}$ 676 and $k_{decouple2}$ 684. Note that the vector sum of the grating vectors is zero.

Figure 6E:
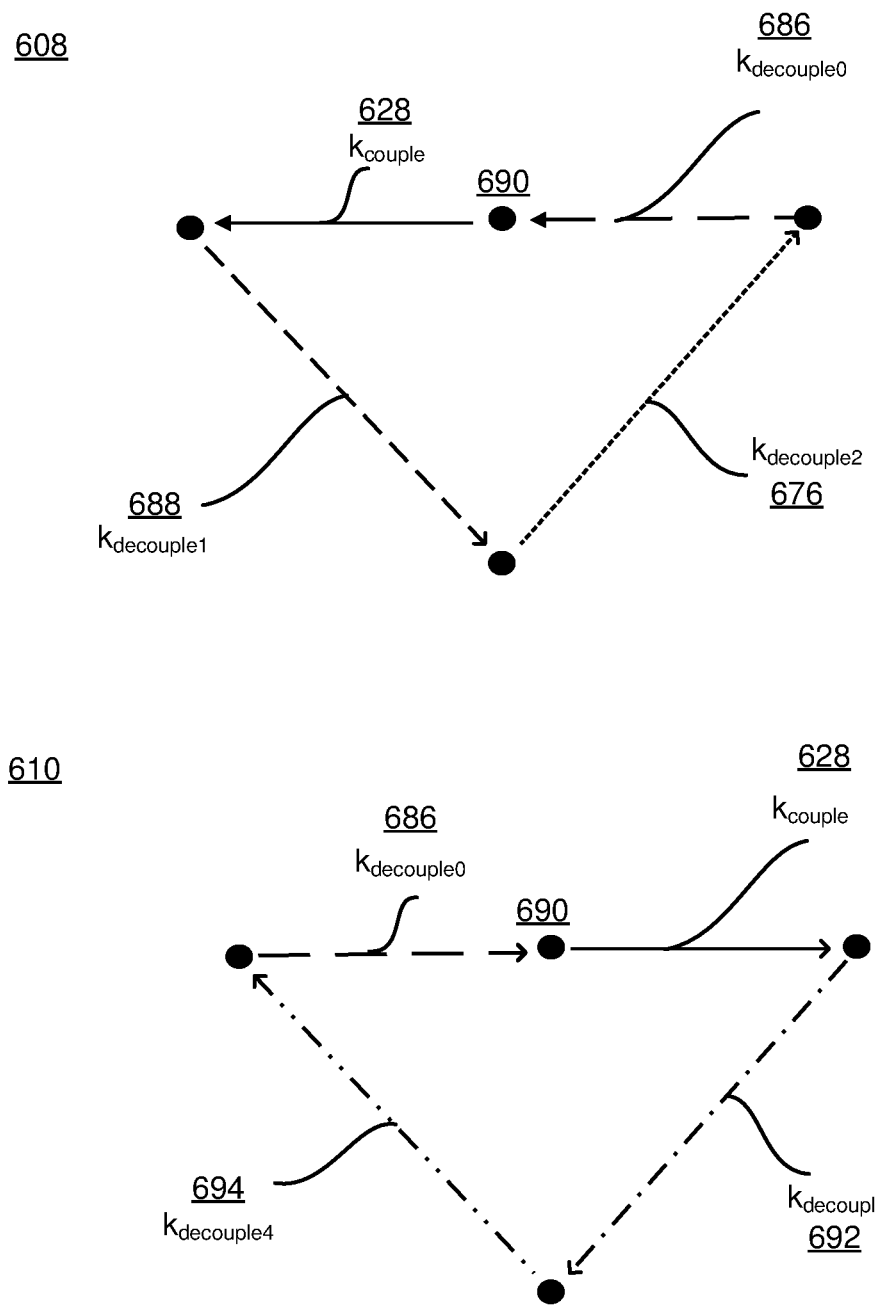
FIG. 6E illustrates an example path of a wave vector in a triangular configuration with two sets of decoupling elements, in accordance with an embodiment.

FIG. 6E illustrates an example path of a wave vector in a triangular configuration with two sets of decoupling elements, in accordance with an embodiment. The example path 608 is associated with a coupling element, and a first set of decoupling elements. The example path 610 is associated with the coupling element, and a second set of decoupling elements. The first set of decoupling elements and the second set of decoupling elements together include five different decoupling elements. The design of the $k_{decouple0}$ 686 is such that its direction and magnitude results in a zero summation at a summation point 690. In the example path 608, the possible order of summation includes the $k_{couple}$ 628, the $k_{decouple1}$ 688, the $k_{decouple2}$ 676, and the $k_{decouple0}$ 686. In the example path 610, the possible order of summation includes the $k_{couple}$ 628, the $k_{decouple3}$ 692, the $k_{decouple4}$ 694, and the $k_{decouple0}$ 686. The example path 608 and the example path 610 illustrate the scenario when the image light is reflected by the decoupling elements three times. Note that the vector sum of the grating vectors is zero.

Figure 7:
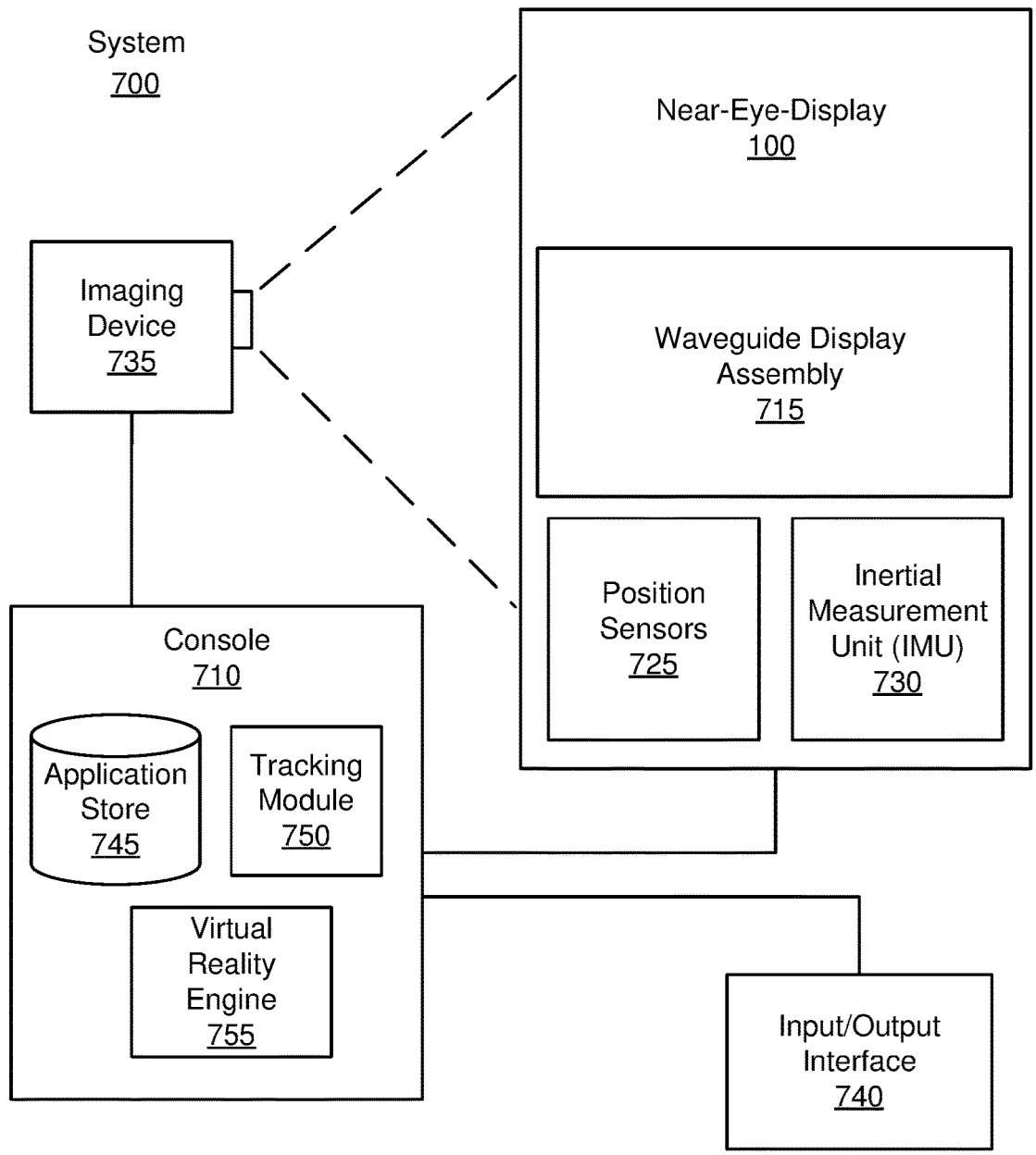
FIG. 7 is a block diagram of a system including the NED of FIG. 1, in accordance with an embodiment.

FIG. 7 is a block diagram of a system 700 including the NED 100, according to an embodiment. The system 700 shown by FIG. 7 comprises the NED 100, an imaging device 735, and an input/output interface 740 that are each coupled to the console 710. While FIG. 7 shows an example system 700 including one NED 100, one imaging device 735, and one input/output interface 740, in other embodiments, any number of these components may be included in the system 700. For example, there may be multiple NEDs 100 each having an associated input/output interface 740 and being monitored by one or more imaging devices 735, with each NED 100, input/output interface 740, and imaging devices 735 communicating with the console 710. In alternative configurations, different and/or additional components may be included in the system 700. Similarly, functionality of one or more of the components can be distributed among the components in a different manner than is described here. For example, some or all of the functionality of the console 710 may be contained within the NED 100. Additionally, in some embodiments the system 700 may be modified to include other system environments, such as an AR system environment and/or a mixed reality (MR) environment.

The NED 100 is a near-eye display that presents media to a user. Examples of media presented by the NED 100 include one or more images, video, audio, or some combination thereof. In some embodiments, audio is presented via an external device (e.g., speakers and/or headphones) that receives audio information from the NED 100, the console 710, or both, and presents audio data based on the audio information. In some embodiments, the NED 100 may also act as an AR eye-wear glass. In these embodiments, the NED 100 augments views of a physical, real-world environment with computer-generated elements (e.g., images, video, sound, etc.).

The NED 100 includes a waveguide display assembly 715, one or more position sensors 725, and the inertial measurement unit (IMU) 730. The waveguide display assembly 715 includes at least the source assembly 310, output waveguide 320, and the controller 330. The output waveguide 320 includes multiple diffraction gratings such that light entering the output waveguide 320 exits the waveguide display assembly 715 at the same angle. Details for various embodiments of the waveguide display element are discussed in detail with reference to FIGS. 3 and 4. The waveguide display assembly includes, e.g., a waveguide display, a stacked waveguide display, a varifocal waveguide display, or some combination thereof.

The IMU 730 is an electronic device that generates fast calibration data indicating an estimated position of the NED 100 relative to an initial position of the NED 100 based on measurement signals received from one or more of the position sensors 725. A position sensor 725 generates one or more measurement signals in response to motion of the NED 100. Examples of position sensors 725 include: one or more accelerometers, one or more gyroscopes, one or more magnetometers, another suitable type of sensor that detects motion, a type of sensor used for error correction of the IMU 730, or some combination thereof. The position sensors 725 may be located external to the IMU 730, internal to the IMU 730, or some combination thereof. In the embodiment shown by FIG. 7, the position sensors 725 are located within the IMU 730, and neither the IMU 730 nor the position sensors 725 are visible to the user (e.g., located beneath an outer surface of the NED 100).

Based on the one or more measurement signals generated by the one or more position sensors 725, the IMU 730 generates fast calibration data indicating an estimated position of the NED 100 relative to an initial position of the NED 100. For example, the position sensors 725 include multiple accelerometers to measure translational motion (forward/back, up/down, left/right) and multiple gyroscopes to measure rotational motion (e.g., pitch, yaw, roll). In some embodiments, the IMU 730 rapidly samples the measurement signals from various position sensors 725 and calculates the estimated position of the NED 100 from the sampled data. For example, the IMU 730 integrates the measurement signals received from one or more accelerometers over time to estimate a velocity vector and integrates the velocity vector over time to determine an estimated position of a reference point on the NED 100. The reference point is a point that may be used to describe the position of the NED 100. While the reference point may generally be defined as a point in space; however, in practice, the reference point is defined as a point within the NED 100.

The imaging device 735 generates slow calibration data in accordance with calibration parameters received from the console 710. The imaging device 735 may include one or more cameras, one or more video cameras, any other device capable of capturing images, or some combination thereof. Additionally, the imaging device 735 may include one or more filters (e.g., used to increase signal to noise ratio). Slow calibration data is communicated from the imaging device 735 to the console 710, and the imaging device 735 receives one or more calibration parameters from the console 710 to adjust one or more imaging parameters (e.g., focal length, focus, frame rate, ISO, sensor temperature, shutter speed, aperture, etc.).

The input/output interface 740 is a device that allows a user to send action requests to the console 710. An action request is a request to perform a particular action. For example, an action request may be to start or end an application or to perform a particular action within the application. The input/output interface 740 may include one or more input devices. Example input devices include: a keyboard, a mouse, a game controller, or any other suitable device for receiving action requests and communicating the received action requests to the console 710. An action request received by the input/output interface 740 is communicated to the console 710, which performs an action corresponding to the action request. In some embodiments, the input/output interface 740 may provide haptic feedback to the user in accordance with instructions received from the console 710. For example, haptic feedback is provided when an action request is received, or the console 710 communicates instructions to the input/output interface 740 causing the input/output interface 740 to generate haptic feedback when the console 710 performs an action.

The console 710 provides media to the NED 100 for presentation to the user in accordance with information received from one or more of: the imaging device 735, the NED 100, and the input/output interface 740. In the example shown in FIG. 7, the console 710 includes an application store 745, a tracking module 750, and a VR engine 755. Some embodiments of the console 710 have different modules than those described in conjunction with FIG. 7. Similarly, the functions further described below may be distributed among components of the console 710 in a different manner than is described here.

The application store 745 stores one or more applications for execution by the console 710. An application is a group of instructions, that when executed by a processor, generates content for presentation to the user. Content generated by an application may be in response to inputs received from the user via movement of the NED 100 or the input/output interface device 740. Examples of applications include: gaming applications, conferencing applications, video playback application, or other suitable applications.

The tracking module 750 calibrates the system 700 using one or more calibration parameters and may adjust one or more calibration parameters to reduce error in determination of the position of the NED 100. For example, the tracking module 750 adjusts the focus of the imaging device 735 to obtain a more accurate position for observed locators on the system 700. Moreover, calibration performed by the tracking module 750 also accounts for information received from the IMU 730.

The tracking module 750 tracks movements of the NED 100 using slow calibration information from the imaging device 735. The tracking module 750 also determines positions of a reference point of the NED 100 using position information from the fast calibration information. Additionally, in some embodiments, the tracking module 750 may use portions of the fast calibration information, the slow calibration information, or some combination thereof, to predict a future location of the NED 100. The tracking module 750 provides the estimated or predicted future position of the NED 100 to the VR engine 755.

The VR engine 755 executes applications within the system 700 and receives position information, acceleration information, velocity information, predicted future positions, or some combination thereof of the NED 100 from the tracking module 750. In some embodiments, the information received by the VR engine 755 may be used for producing a signal (e.g., display instructions) to the waveguide display assembly 715 that determines the type of content presented to the user. For example, if the received information indicates that the user has looked to the left, the VR engine 755 generates content for the NED 100 that mirrors the user's movement in a virtual environment by determining the type of source and the waveguide that must operate in the waveguide display assembly 715. For example, the VR engine 755 may produce a display instruction that would cause the waveguide display assembly 715 to generate content with red, green, and blue color. Additionally, the VR engine 755 performs an action within an application executing on the console 710 in response to an action request received from the input/output interface 740 and provides feedback to the user that the action was performed. The provided feedback may be visual or audible feedback via the NED 100 or haptic feedback via the input/output interface 740.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A waveguide display, comprising:
a light source configured to emit image light in accordance with display instructions, the emitted image light propagates along an input wave vector;
an output waveguide comprising:
a waveguide body that includes a first surface and a second surface that is opposite to the first surface, a first grating configured to receive the image light emitted from the light source and to couple the received image light into the waveguide body, a second grating included as part of the first surface of the waveguide body, and a third grating included as part of the second surface of the waveguide body and positioned opposite to the second grating, at least one of the second grating and the third grating configured to output the image light to an eyebox, the output image light propagating along an output wave vector that matches the input wave vector, wherein wave vectors associated with the first grating, the second grating, and the third grating are of different magnitudes; and a controller configured to generate the display instructions and provide the display instructions to the light source.

2. The waveguide display of claim 1, wherein the first grating is associated with a first wave vector, the second grating is associated with a second wave vector, the third grating is associated with a third wave vector, and the vector sum of the first wave vector, the second wave vector and the third wave vector equal to zero.

3. The waveguide display of claim 1, wherein the first grating includes a first coupling element on the first surface and a second coupling element on the second surface.

4. The waveguide display of claim 1, further comprising:
a second output waveguide configured to receive the emitted image light from the light source along a first dimension and to expand the emitted image light along the first dimension.

5. The waveguide display of claim 1, wherein the light source is selected from a group consisting of: a laser diode, a vertical cavity surface emitting laser, a light emitting diode, a tunable laser, a MicroLED, a superluminous LED (SLED), and some combination thereof.

6. The waveguide display of claim 1, wherein each of the first grating, the second grating and the third grating is selected from a group consisting of: a diffraction grating, and a holographic grating.

7. The waveguide display of claim 1, wherein the image light output from the output waveguide is monochromatic and in a first color band, and the waveguide display is part of a polychromatic display that includes at least one other waveguide display that outputs image light that is monochromatic and in a second color band that is different than the first color band.

8. An output waveguide comprising:
a waveguide body that includes a first surface and a second surface that is opposite to the first surface,
a first grating configured to receive image light based on a plurality of light emitted from a plurality of light sources and to couple the received image light into the waveguide body, the emitted image light propagating along an input wave vector,
a second grating included as part of the first surface of the waveguide body, and
a third grating included as part of the second surface of the waveguide body and positioned opposite to the second grating, at least one of the second grating and the third grating configured to reflect the image light at least twice and to output the image light to an eyebox, the output image light propagating along an output wave vector that matches the input wave vector.

9. The output waveguide of claim 8, wherein the first grating is associated with a first wave vector, the second grating is associated with a second wave vector, the third grating is associated with a third wave vector, and the vector sum of the first wave vector, the second wave vector and the third wave vector equal to zero.

10. The output waveguide of claim 8, wherein the first grating includes a first coupling element on the first surface and a second coupling element on the second surface.

11. The output waveguide of claim 8, wherein one of the light sources is selected from a group consisting of: a laser diode, a vertical cavity surface emitting laser, a light emitting diode, a tunable laser, a MicroLED, a superluminous LED (SLED), and some combination thereof.

12. The output waveguide of claim 8, wherein each of the first grating, the second grating and the third grating is selected from a group consisting of: a diffraction grating, and a holographic grating.

13. A near-eye display (NED), comprising:
a frame;
a waveguide display comprising:
a plurality of light sources configured to emit image light in accordance with display instructions, the emitted image light propagates along an input wave vector;
an output waveguide comprising:
a waveguide body that includes a first surface and a second surface that is opposite to the first surface,
a first grating configured to receive the image light emitted from the light sources and to couple the received image light into the waveguide body,
a second grating included as part of the first surface of the waveguide body, and
a third grating included as part of the second surface of the waveguide body and positioned opposite to the second grating, at least one of the second grating and the third grating configured to output the image light to an eyebox, the output image light propagating along an output wave vector that matches the input wave vector, wherein wave vectors associated with the first grating, the second grating, and the third grating are of different magnitudes; and
a controller configured to generate the display instructions and provide the display instructions to the light sources.

14. The near-eye display of claim 13, wherein the first grating is associated with a first wave vector, the second grating is associated with a second wave vector, the third grating is associated with a third wave vector, and the vector sum of the first wave vector, the second wave vector and the third wave vector equal to zero.

15. The near-eye display of claim of claim 13, wherein the first grating includes a first coupling element on the first surface and a second coupling element on the second surface.

16. The near-eye display of claim 13, further comprising:
a second output waveguide configured to receive each of the emitted image light from each of the plurality of light sources along a first dimension and expand the emitted image light along a second dimension orthogonal to the first dimension.

17. The near-eye display of claim 13, wherein the image light is monochromatic and in a first color band, and the waveguide display includes at least one other waveguide display that outputs image light that is monochromatic and in a second color band that is different than the first color band.

18. The near-eye display of claim 13, wherein each of the first grating, the second grating and the third grating is selected from a group consisting of: a diffraction grating, and a holographic grating.

\* \* \* \* \*